Mar. 6, 1923.
J. A. McGREW ET AL.
ENTRAINMENT MECHANISM FOR POWER GENERATING UNITS.
FILED DEC. 29, 1921.
1,447,353.
3 SHEETS—SHEET 1.
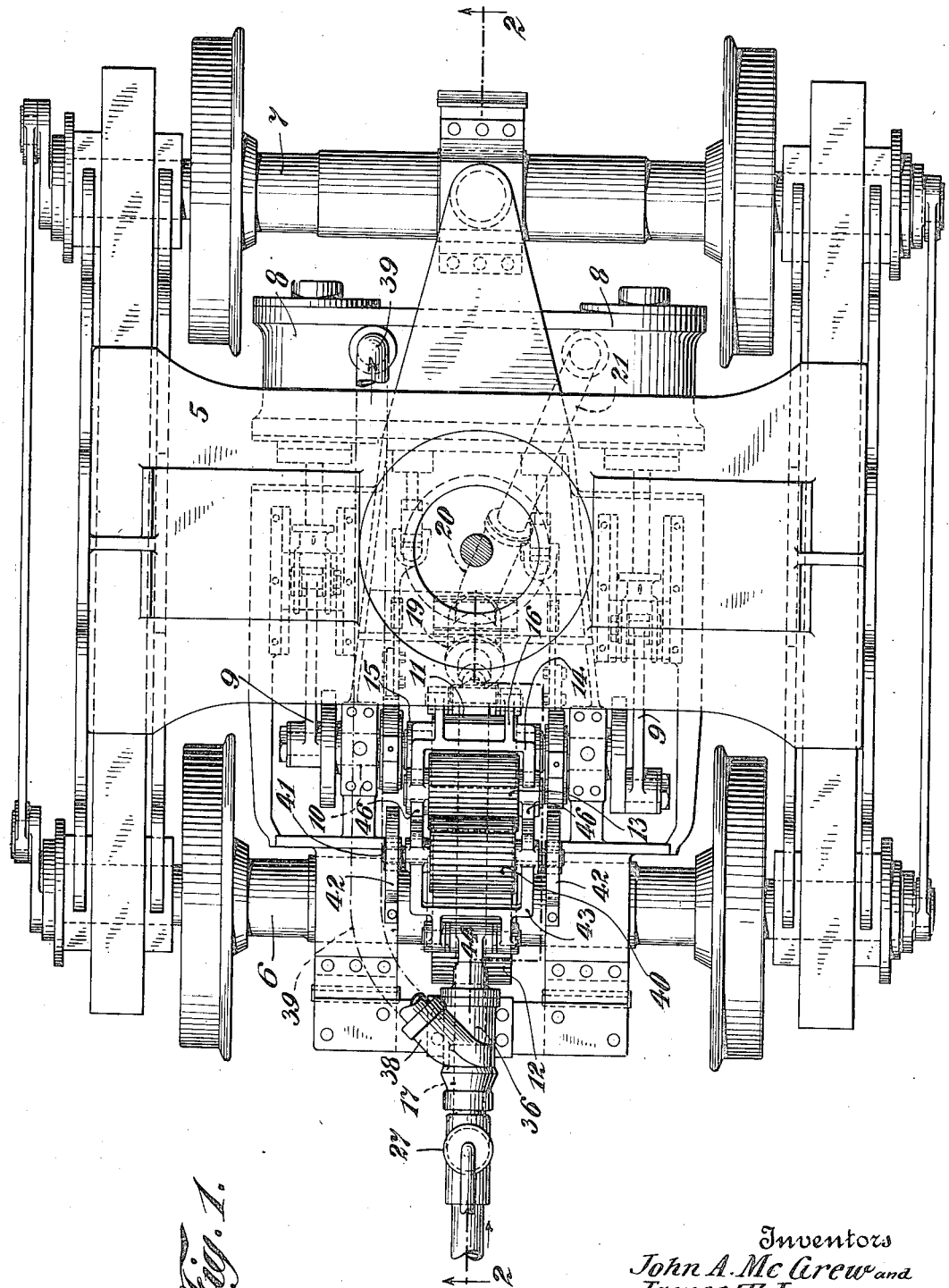
Fig. 1.
Inventors
John A. McGrew and
James T. Loree
By their Attorney
C. P. Goepel

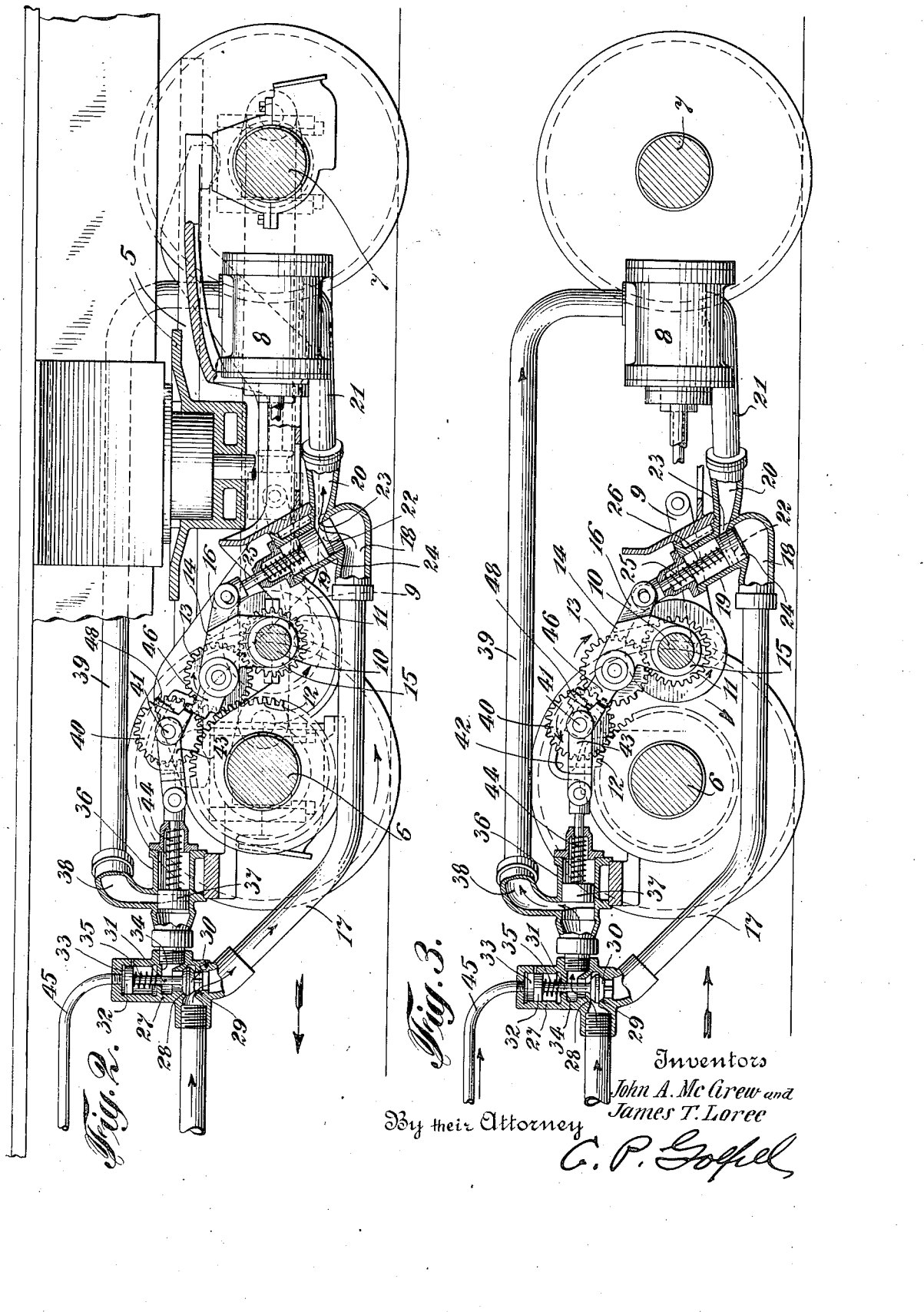

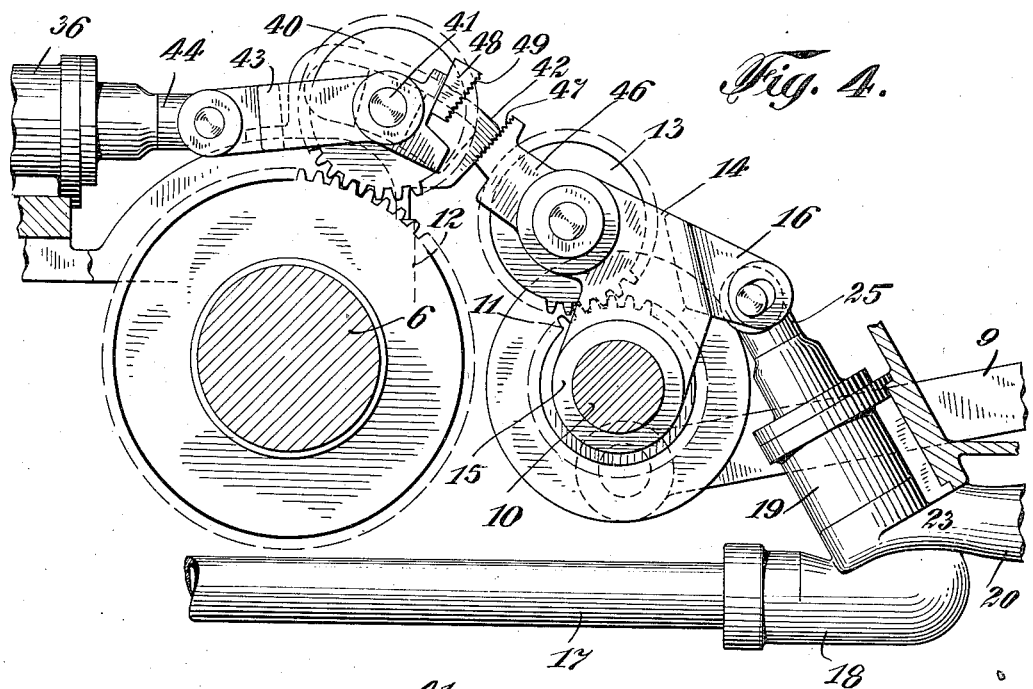
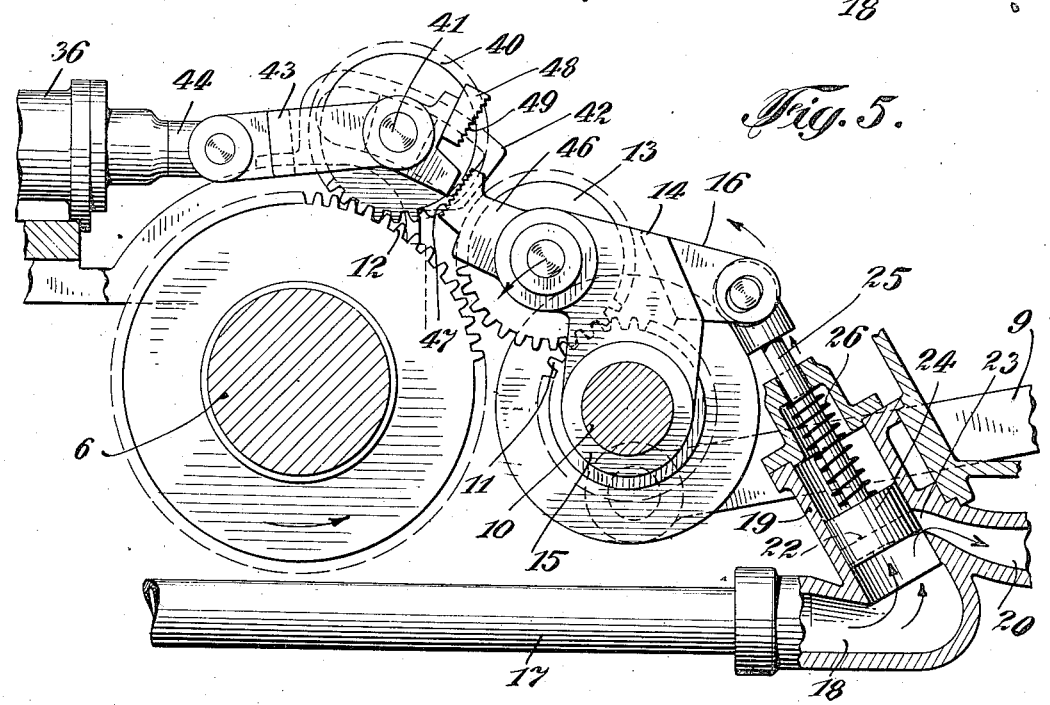

Patented Mar. 6, 1923.

1,447,353

UNITED STATES PATENT OFFICE.

JOHN A. McGREW AND JAMES T. LOREE, OF ALBANY, NEW YORK.

ENTRAINMENT MECHANISM FOR POWER-GENERATING UNITS.

Application filed December 29, 1921. Serial No. 525,747.

*To all whom it may concern:*

Be it known that we, JOHN A. McGREW and JAMES T. LOREE, both citizens of the United States, and residents of the city of Albany, county of Albany, and State of New York, have invented certain new and useful Improvements in Entrainment Mechanism for Power-Generating Units, of which the following is a specification.

This invention relates to entrainment mechanism for power generating units. In a co-pending application for patent filed December 29, 1921, Serial No. 525,746, we have described and claimed a means for automatically effecting entrainment of a power generating unit with a shaft to be driven thereby in which the power of the energizing medium for said unit is utilized for the purpose of operating the entrainment mechanism. Such disclosure, however, provides only for the transmission of rotation from the power generating unit to the driven shaft in one direction. In the present application we provide means whereby the rotation of the driven shaft may be reversed at will.

Generically considered, the invention comprehends the provision of an entrainment mechanism for reversibly transmitting rotation from the power generating unit to the driven shaft which is normally in an ineffective position and means for controlling the supply of the steam or other energizing medium to the power generating unit to cause the same to actively influence certain elements of the entrainment mechanism and thereby secure the full effective entrainment of the power unit to the driven shaft to drive the latter in the desired direction prior to the full speed operation of the power unit.

The present invention is particularly designed for use in connection with vehicle propulsion units, such as auxiliary or booster motors for locomotives as referred to in another co-pending application for patent filed December 15, 1921, Serial No. 522,525, for which purpose the present invention has been found especially efficient and reliable in practice. However, it will be readily appreciated as the description proceeds, that our present invention is one which is of more or less general application for the purpose of transmitting power from a motor or generating unit to a shaft or axle to be driven thereby.

In a specific embodiment of our invention, we provide a shiftable power transmission gear between the gear on a driving shaft actuated by the power generating unit and a gear fixed to the driven shaft. In addition, a shiftable reversing gear is in constant mesh with the gear on the driven shaft and normally spaced from said transmission gear. The supply of steam to the cylinders of the power generating unit is controlled by a by-pass valve and in separate branches of the steam supply line, pressure responsive means is arranged and operatively connected to the transmission gear and reversing gear respectively whereby said gears are shifted to their entrained positions upon the initial operation of the power generating unit and prior to its effective operation at maximum speed.

Generally, our invention has for its object to provide such an entrainment mechanism automatically actuated by means responsive to the influence of the energizing medium for the power unit and controllable at the will of operator to transmit power in either direction to the driven shaft, such mechanism in its essential features consisting of relatively few parts of simple form, positive and reliable in their operation, and not likely to get out of order.

With the above and other objects in view, the invention consists in the improved entrainment mechanism and in the form, construction and relative arrangement of its several parts, as will be hereinafter more fully described, illustrated in the accompanying drawings and subsequently incorporated in the subjoined claims.

In the drawings wherein we have disclosed an embodiment of our present invention which has given highly satisfactory results in service and in which similar reference characters designate corresponding parts throughout the several views:

Figure 1 is a top plan view showing our present invention as applied to a booster or auxiliary propulsion unit for a locomotive, its tender, coach, or other wheeled vehicle;

Figure 2 is a longitudinal section taken on the line 2—2 of Figure 1 and showing the relative positions of the parts of the entrainment mechanism for the transmission of rotation in one direction to the shaft or axle;

Figure 3 is a similar view showing the relative positions of the parts of said mechanism for rotating the shaft or axle in a reverse direction;

Figure 4 is an enlarged detail view showing the parts of the entrainment mechanism in neutral or normal position; and Figure 5 is a view similar to Figure 4 with one of the valves in section, showing the position of the movable valve member with relation to the power transmission gear immediately prior to full entrainment of the gears.

In the embodiment of our invention illustrated in the accompanying drawings, we have shown the same applied for use in connection with a booster or auxiliary propulsion motor such as that shown and described in our patent granted April 11, 1922, 1,412,250, to which reference may be had for a detail explanation of this power generating unit.

For the purposes of the present explanation it will suffice to state that the parts of the power generating unit are carried by a frame 5 which is supported in suspended relation between spaced shafts or axles 6 and 7 respectively of the vehicle truck. However, as will hereinafter become apparent, in so far as the essential features of this invention are concerned, they are not necessarily limited in their application and use to a booster motor for vehicle trucks, as the entrainment mechanism might likewise be effectively utilized for the transmission of power from power generating units of general application, to a driven shaft.

In the present disclosure we have illustrated the power generating unit as including spaced cylinders 8 in which reciprocating pistons are arranged, said pistons being connected by the rods 9 to opposite ends of a driving shaft 10. Power is transmitted from the shaft 10 to the shaft or axle 6 by means of suitable gearing which is normally idle or ineffective for the positive transmission of power. This gearing includes a driving gear 11 fixed on the shaft 10 and a relatively large gear 12 fixed on the driven shaft 6.

The gears 11 and 12 are of such relative diameters that they do not mesh with each other and rotation is transmitted from shaft 10 to the shaft 6 through the medium of a transmission gear 13 which has constant meshing engagement with the gear 11. This transmission gear is mounted in a yoke shaped frame 14 for circumferential movement with respect to the gear 11, said frame having an oscillating bearing 15 upon the driving shaft 10 at each side of the gear 11.

The frame 14 is also provided with a laterally projecting bifurcated arm or fork 16 to which pressure responsive means is operatively connected as will presently be described whereby the transmission gear 13 is caused to track around the gear 11 so that said transmission gear is moved into entrained relation with the gear 12 on the driven shaft 6.

Steam or other suitable energizing medium is supplied to the cylinders 8 of the power generating unit through the pipe 17 one end of which is connected to the intake 18 which extends laterally in one direction from the lower end of a cylindrical valve casing 19. To the outlet 20 extending in the opposite direction from said valve casing, the pipe 21 leading to the cylinders 8 is suitably coupled or connected.

The opposite sides of the wall of the valve casing 19 at its lower end are grooved or channeled as at 22, the sides of said channels as they approach the outlet port 23 being widened or flared. The passage of steam through the outlet port 23 is controlled by a valve piston 24 having a stem or rod 25 operatively connected at its upper end to the arm or fork 16 of the transmission gear frame 14. The valve piston 24 is urged downwardly to its normal position, as seen in Figure 3 of the drawings, by means of a suitable spring 26, in which position of the valve piston communication between the inlet and outlet sides of the valve cylinder is cut off and the transmission gear is yieldingly retained in a position in spaced relation to the gear 12 on the driven axle.

In securing a proper entrainment of the power generating unit with the driven axle, the pressure actuated valve just described is of prime importance. However, in so far as the subject matter claimed in this application is concerned, it is possible that other specific forms of valves might be utilized and we, therefore, do not herein claim the valve per se, but have embodied such claims in an independent copending application for patent filed January 6th, 1922, Serial No. 527,302.

The pipe 17 leads to the valve cylinder 19 from a by-pass valve generally indicated at 27. This by-pass valve may be of any conventional form, but as herein disclosed, the valve casing or cylinder is provided in its lower portion with opposed annular seats 28 and 29 for a movable valve member 30, said valve member having an upwardly extending stem 31 provided with a piston 32 operating in a compressed air receiving chamber 33. This chamber is separated from the steam receiving chamber of the valve cylinder by the partition wall 34 and a coil spring 35 disposed between the piston 32 and said partition wall normally urges the piston and the valve 30 upwardly so that said valve is engaged against the seat 28. Above said seat the steam receiving chamber is connected to one end of a laterally extending valve cylinder 36 corresponding to the valve cylinder 19 and also having a spring pressed valve member 37 mounted therein and controlling the passage of the steam to the outlet 38 of the valve cylinder. This valve cylinder outlet is connected by the pipe 39 with the cylinders 8 of the power generating unit.

The reversing gear 40 has constant meshing engagement with the driven gear 12, the shaft or axis 41 of said reversing gear being journaled at its ends in suitable bearings movable in slotted guides 42. The axis 41 of the reversing gear is also mounted in the arms of a yoke 43 which is pivotally connected to the rod 44 of the valve 37.

When the power generating unit is not in operation, the several parts of the entrainment mechanism are in neutral position as seen in Figure 4 of the drawings, or in other words, the transmission gear is out of mesh with the gears 12 and 40. When the steam or other energizing medium is supplied to the cylinders of the power unit through pipe 17, the valve 30 being in the normal position as seen in Figure 2, the steam pressure first acts against the lower face of the valve piston 24 forcing the same upwardly against the action of the spring 26. When the piston reaches the position seen in Figure 5 of the drawings where its lower face is in a plane slightly above the lower edge of the outlet port 23, the steam in relatively small volume, passes through said port and the pipe 21 into the cylinders 8 so that the pistons therein are initially operated at slow speed. In the movement of the valve piston to such a position, the frame 14 is, of course, oscillated on the driving shaft 10 and the transmission gear element is moved to the position shown in Figure 5 with its teeth substantially located on the peripheral line of the teeth of the gear 12 and as the teeth of the gear 13 are not in registering relation with the spaces between the teeth on the gear 12, the movement of gear 13 to its entraining position will be momentarily arrested until there is sufficient rotative movement of said gear in the initial slow operation of the power generating unit to cause such registration. Instantaneously the steam then acts to continue the movement of the valve piston 24 and fully open the port 23 as shown in Figure 2 of the drawings, thus effecting complete entrainment of the transmission gear 12 synchronously with the effective full speed operation of the power generating unit.

This entraining mechanism for transmitting power from the power generating unit and rotating the driving shaft in one direction is fully illustrated, described and claimed in our co-pending application for patent Serial No. 525,746, and is, therefore, not herein claimed independently of the association in combination therewith of the means above referred to whereby an effective entrainment may be secured to reverse the rotation of the driven shaft or axle.

Assuming that the shaft 6 is being driven in the direction indicated by the arrow in Figure 2 of the drawings as above described and it is desired to reverse the rotation of said shaft, air is admitted to the chamber 23 from a suitable source of compressed air through the pipe 45 and the piston 33 forced downwardly, thereby engaging the valve 30 with the lower seat 29 thus cutting off the flow of steam into the pipe 17. The steam now passes through the by-pass valve cylinder 27 into the end of valve cylinder 36 and acts against the piston 37 therein to operate said valve piston in the same manner that the piston 24 is operated, as above explained. Concurrently with this operation the spring 26 returns the latter valve to its normal position thereby moving the transmission gear 13 to its neutral position out of meshing engagement with the gear 12 while the operation of the power generating unit is continued at slow speed by means of the steam supplied through the pipe 29 so that the transmission gear 13 will be slowly rotated until its teeth register with the spaces between the teeth of the reversing gear 40. The movement of said gear around the gear 12 is then continued as the valve piston 37 is forced to its full open position so that complete entrainment of the gears 13 and 14 with each other is obtained simultaneously with the operation of the power generating unit at maximum speed. The several gear elements are now in the positions shown in Figure 3 of the drawings so that rotation is transmitted from the gear 11 on the driving shaft through the gear 13 to the gear 40 and from said latter gear to the gear 12 on the driven shaft 6, thus reversing the direction of rotation of said shaft.

In order to prevent possible binding of the teeth of the gears 13 and 40 with each other, the frame 14 may be provided with fingers 46 at opposite sides of the transmission gear 13 having serrated edges 47 with which the serrated edges 49 of adjustable wedge blocks 48 coact to limit the circumferential shifting movement of the reversing gear 40.

From the foregoing description considered in connection with the accompanying drawings, the construction, manner of operation and several advantages of our present invention will be clearly understood. It will be seen that we provide means responsive to the influence of the energizing medium for the power generating unit which effects full entrainment of said unit with the driven shaft concurrently or simultaneously with the effective full speed operation of said unit, and maintains an effectively entrained relation of the power unit with the driven shaft so long as the supply of the energizing medium for said unit is continued and without necessitating the use of an auxiliary means for maintaining entrainment. In other words, we have provided an automatic pressure responsive means possessing the dual function of maintaining a governed control of the initial operation of the power generating unit and for effecting complete entrainment with a driven shaft synchronously with the full speed operation of the power unit. It will accordingly be appreciated that by eliminating the necessity of providing compressed air actuated valves or other means for effecting and maintaining an entrained relation of the power unit with the driven shaft, the cost incident to the installation and maintenance of such mechanisms is reduced to a minimum, owing to the fact that the entraining connection or movement is correlated to the initial operation of the power generating unit.

We have herein described in some detail a practical embodiment of our invention which has given excellent results. However, as previously noted, the invention constituting the subject matter of this application is one of more or less general application and in view of the many possible adaptations thereof it is not to be expected that certain mechanical variations in structure will not be required. It is, therefore to be understood that while we have specifically referred to a preferred construction, the device might nevertheless be exemplified in numerous other alternative forms. Accordingly, we reserve the privilege of resorting to all such legitimate changes in the form, construction and relative arrangement of the several parts as may be fairly embodied within the spirit and scope of the invention as claimed.

We claim:

1. In combination with driving and driven shafts, mechanism for entraining said shafts with each other including relatively shiftable elements effective to drive the driven shaft in reverse directions, and independent selectively operable fluid-pressure-responsive devices directly connected to said elements for shifting the respective elements to drive said shaft in the desired direction.

2. In combination with driving and driven shafts, mechanism for entraining said shafts with each other and transmitting rotation to the driven shaft in either direction, fluid-pressure-responsive devices co-operatively associated with parts of said mechanism and normally maintaining the same in disentrained positions, and fluid pressure supply means including a control valve operable to selectively subject said devices to the influence of the fluid pressure and thereby entrain the driving shaft with the driven shaft to drive the latter in the desired direction.

3. In combination with a power generating unit, mechanism for entraining said unit with a driven shaft including relatively shiftable elements effective to drive said shaft in reverse directions and selectively controllable devices responsive to the influence of the energizing medium for said power generating unit to shift said elements of the entrainment mechanism and drive said shaft in the desired direction.

4. In combination with a power generating unit, mechanism for entraining said unit with a driven shaft and including means for driving said shaft in reverse directions, pressure-responsive devices co-operating with said means and normally maintaining the same in disentrained relation to the driven shaft, and means for supplying a fluid pressure medium for the operation of the power generating unit including means for selectively subjecting said devices to the influence of the fluid pressure to thereby entrain the power generating unit with the driven shaft to drive the latter in the desired direction.

5. In combination with a power generating unit, entrainment gearing for operatively connecting said unit to a shaft to be driven thereby including means for effecting the rotation of said shaft in reverse directions, and means influenced by the energizing medium for said power generating unit to establish entrainment of said unit with the shaft and drive the latter in the desired direction synchronously with the effective operation of said unit.

6. In combination with a power generating unit, entrainment gearing for operatively connecting said unit to a shaft to be driven thereby including relatively shiftable gear elements, and selectively operable devices controlling the supply of the energizing medium to said power unit and acting under the influence of said medium to move the respective gear elements to an entraining position and effect entrainment to drive said shaft in the desired direction synchronously with the effective operation of said power generating unit.

7. In combination with a power generating unit and a driving shaft operated thereby, normally ineffective power transmitting means for connecting said driving shaft to a driven shaft including means for rotating the driven shaft in either direction, and means operatively connected to said last named means and actuated under the influence of the energizing medium for the power generating unit to position said entrainment means and effect complete entrainment with the driven shaft synchronously with the effective operation of the power generating unit to drive said shaft in the desired direction.

8. In combination with a power generating unit and steam supply means therefor, including branch pipes connected by a by-pass valve, entrainment gearing to connect said power generating unit to a shaft to be driven thereby, and pressure-responsive devices interposed in each of said by-pass pipes and respectively connected to parts of the entrainment gearing to effect complete entrainment with the driven shaft synchronously with the full speed operation of the power generating unit.

9. In combination with a power generating unit and steam supply means therefor, including branch pipes connected by a by-pass valve, entrainment gearing to connect said power generating unit to a shaft to be driven thereby, and pressure-responsive devices interposed in each of said by-pass pipes and respectively connected to parts of the entrainment gearing to initiate the operation of the power generating unit at relatively slow speed and effect a running entrainment of said unit with the driven shaft and to synchronously supply steam in full volume for the effective operation of said power generating unit.

10. In combination with a power generating unit and a driving shaft operatively connected thereto, a gear fixed upon said driving shaft, a driven shaft, a transmission gear engaged with the gear on the driving shaft, means for engaging said transmission gear with a gear on the driven shaft to rotate the latter in one direction, a reversing gear engaged with the gear on the driven shaft, and means operatively connected to the reversing gear and controlling the supply of the energizing medium to the power generating unit and subject to the influence thereof to entrain the reversing gear with said transmission gear in the normal position of the latter and effect the complete entrainment of said gears synchronously with the full speed operation of the power generating unit to rotate the driven shaft in a reverse direction.

11. In combination with driving and driven elements, entraining mechanism therefor including power transmitting elements mounted for independent axial rotation and planetary movement with relation to the driving and driven elements respectively, and independently operable means for imparting planetary movement to the respective power transmitting elements to entrain the driving and driven elements with each other and drive the latter in the desired direction.

12. In combination with driving and driven elements, entraining means therefor including power transmitting elements mounted for independent axial rotation and planetary movement in constant operative engagement with the driving and driven elements respectively, said power transmission elements being adapted for engagement with each other to transmit rotation to the driven element in one direction, and independently operable means for imparting planetary movement to the respective power transmitting elements to thereby entrain the driving and driven elements with each other and drive the latter in the desired direction.

13. In combination with driving and driven elements, entraining means therefor including power transmission elements mounted for independent axial rotation and planetary movement with relation to the driving and driven elements, and independent selectively operable fluid pressure responsive devices connected to the respective power transmitting elements for imparting plantary movement thereto to entrain the driving and driven elements with each other and thereby drive the latter in the desired direction.

14. In combination with driving and driven elements, entraining means therefor including power transmitting elements mounted for independent axial rotation and planetary movement with relation to the driving and driven elements respectively, and manually controllable fluid pressure responsive means operable to selectively impart planetary movement to the power transmission elements and thereby entrain the driving and driven elements with each other to drive the latter in the desired direction.

In testimony that we claim the foregoing as our invention, we have signed our names hereunder.

JOHN A. McGREW.
JAMES T. LOREE.